US010842213B2

(12) United States Patent
Campbell, Jr.

(10) Patent No.: US 10,842,213 B2
(45) Date of Patent: Nov. 24, 2020

(54) AUTOMATED PROCESS OF MANUFACTURING CLOTHING

(71) Applicant: Clay Eugene Campbell, Jr., East Point, GA (US)

(72) Inventor: Clay Eugene Campbell, Jr., East Point, GA (US)

(73) Assignee: Clay E. Lampbell, Jr.

( * ) Notice: Subject to any disclaimer, the term of this patent is extended or adjusted under 35 U.S.C. 154(b) by 136 days.

(21) Appl. No.: 16/268,369

(22) Filed: Feb. 5, 2019

(65) Prior Publication Data
US 2020/0245707 A1    Aug. 6, 2020

(51) Int. Cl.
*A41H 43/02*    (2006.01)

(52) U.S. Cl.
CPC ............... *A41H 43/0235* (2013.01); *G05B 2219/45222* (2013.01)

(58) Field of Classification Search
CPC . A41H 3/00; A41H 3/007; A41H 3/01; A41H 3/015; A41H 3/04; A41H 5/00; A41H 5/01; A41H 42/00; D05B 75/00; A47B 29/00; G05B 2219/45222
USPC ........................................ 112/470.14, 470.06
See application file for complete search history.

(56) References Cited

U.S. PATENT DOCUMENTS

| | | | | |
|---|---|---|---|---|
| 4,756,261 A * | 7/1988 | Gershoni | ............. | B65H 3/0808 112/104 |
| 4,915,040 A * | 4/1990 | Sakuma | ............. | A41D 27/10 112/104 |
| 4,957,054 A * | 9/1990 | Sakuma | ............. | A41D 27/10 112/470.13 |
| 5,419,268 A * | 5/1995 | Fyler | ............. | D05B 23/00 112/470.14 |
| 5,458,265 A * | 10/1995 | Hester | ............. | D06B 11/0096 223/72 |
| 6,401,641 B1 * | 6/2002 | Miyano | ............. | D05B 21/00 112/470.05 |
| 6,813,838 B2 * | 11/2004 | McCormick | ............. | A41H 3/007 33/17 R |
| 9,782,906 B1 * | 10/2017 | Aminpour | ............. | B26D 5/005 |
| 2010/0070384 A1 * | 3/2010 | Kruusmaa | ............. | G06Q 30/0601 705/26.1 |

FOREIGN PATENT DOCUMENTS

GB          2129283 A    *  5/1984   .............  D05B 23/00

* cited by examiner

*Primary Examiner* — Michael McCullough

(57) ABSTRACT

The purpose of this process is to remove the human contact of fabric in assembling products and producing clothing faster without several stations of production in different locations in the factor. In the past, a typical factor would sew individual pieces at one station and pass them along to different stages in the assembly process until its completed. However, this process is meant to eliminate it, improve efficiency, and productivity. This process will not include any human contact with fabric, less time in production, and the removal of products in different stations. The benefits of this enable a company to produce what they need as needed, instead of producing a factor's minimum. Furthermore, this process shortens the lead time to bring products to market faster. Finally, this process helps with cash-flow, which is essential in any business especially in manufacturing.

7 Claims, 2 Drawing Sheets

AUTOMATED PROCESS OF MANUFACTURING CLOTHING

CROSS REFERENCE TO RELATED APPLICATION

Figure 1:
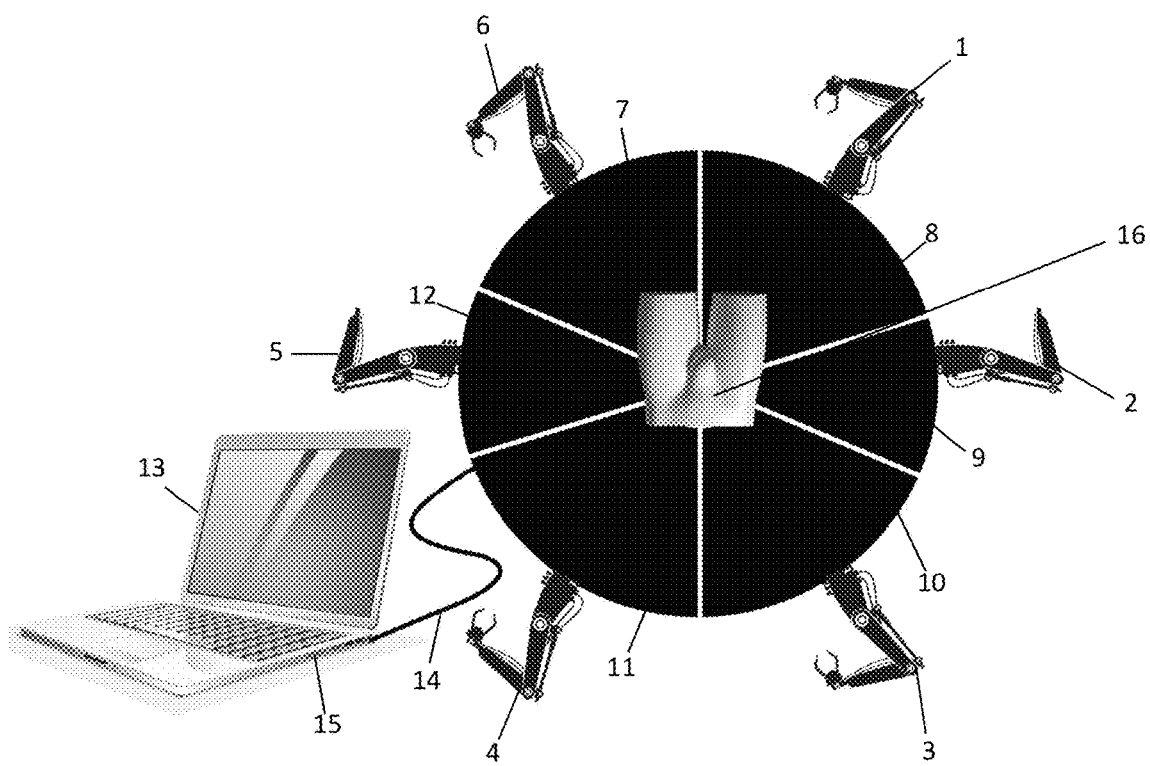

No provisional application has been filed for this design patent.

BACKGROUND OF THE INVENTION

Field of the Invention

This method of process pertains to garment manufacturing. More specifically, this method of process relates to the automation of the manufacturing process for garments. This method of process is a circular assembly line that will be assembled by robotic arms working continuously as a team, in addition to the circular shaped tables with attached trays, dimensioned mannequins, and a computer with the computer program. In order to achieve a finished product, each robotic arm will have an individual task to do instead of transferring fabrics to various stations for human lead manufacturing.

This process is meant to eliminate the use of individual stations for manufacturing garments in order to improve efficiency and productivity. This process will decrease human error, decrease production time, and decrease staffing needs. The benefits of this enable a company to produce what they need as needed, instead of producing a factor's minimum. Furthermore, this process shortens the lead time to bring products to market faster. As a result, this process helps decrease cost of production and increase cash-flow, which is essential in the manufacturing business.

Business and individuals seeking to manufacture various clothing garments, utilize human lead assembly type processes. This has lead to delay in production due to human error and human pacing. This also leads to increase in production costs due to the need for increase human labor to work the various production stations and increased production spacing needs to house these various processing stations. The current manufacturing process also leads to less accessibility for individuals seeking to manufacture products in a sustainable and economical manner. These individuals may lack the requisite manufacturing knowledge and labor needs to produce clothing garments according to their desired specifications. This current process design seeks to eliminate the human lead reliance in the current process of manufacturing clothing garments. The process design seeks to cut business costs by decreasing manufacturing times and labor costs and increasing accuracy and production. This design process also seeks to extend production of garments that would have been difficult to produce according to customer specifications within the current process of manufacturing garments commonly used today. The current process can be adapted according to the size of the designing machine to accommodate both large scale manufacturing and small scale manufacturing. In addition, the current process seeks to increase the ability to manufacture garments in a custom-fit manner due to the adjustable mannequins sizing aspects and the use of the computer-generated specifications sent to the manufacturing machine.

Description of Prior Art

Some attempted solutions have tried to utilize a centralized command center and robotic arms to manufacture garments, but the process offers less flexibility in the production process and the quality controls offered by the current process because of its use of the adjustable mannequins and alternative sizing of the the machinery. Other attempted solutions have not extended to the area of automating the fabrics to manufacture various types of clothing garments through the use of one machine. Other attempted solutions used automation in one step of the manufacturing process but have not addressed the use of automation in the entire manufacturing process from pattern to finished garment. Other solutions have utilized bigger machinery and tubing infrastrures to manufacture garments, but these processes offer limited flexibility in the types of garments that can be produced and continue to require the different steps in processing to be handled at different stations in a facility. Also, none of the previous solutions have addressed the adaptability of the machinery for big industrial use and smaller individual use. The present invention provides a process for manufacturing various types of custom clothing garments on varying scales of production without the need for multiple stations in the manufacturing process. Those manufacturing processes deemed most relevant to the present disclosure are presented herein.

Specifically, U.S. Patent No. 20140277683 to Rohin discloses a cumbersome machinery station with automated manufacturing equipment to produce personalized custom-fit garments. The machinery uses custom measurements from a body scan imputed into the nesting software system, which then uses robotic manipulators to handle fabrics, cut the pieces, and sew garments at a rate of 15-20 minutes per garment in an unfinished state. The present invention utilizes any computing device loaded with the corresponding imputing software which is then connected to the manufacturing machinery station. The station uses robotic arms to handle materials, cut pieces, and sew garments around the sized mannequin figures. The use of the sized mannequin eliminates the need for a body scan or transferring personalized measurement information to the computer system to get a custom-fit while still providing a variety of custom-like sized garments. In addition, the mannequin fitting would offer a more realistic fitting of materials on the human body. These garments can be produced on a larger scale in a faster production time, which would benefit large scale production businesses seeking to reduce labor cost and associated labor cost. The current design also contemplates a smaller scale system that could be used by lay persons without the increased cost of a clunky larger manufacturing machine that you have to input information into an operating system within the machinery. Users of the current design will have the ease of using familiar computing devices connected to the machinery.

In U.S. Pat. No. 8,958,901 to Nike is a process that automates portions of the manufacturing of shoes. The process contemplates both automated and human integration in the manufacturing of the shoes. The pieces are prepared at different stations of the process and are them assembled at various stations in the process. The parts are transferred via conveyor belts to various stations. The current invention differs from the disclosure in Nike's process by construction and intent of the design. The present process seeks to eliminate the use of various stations in the manufacturing process and the need for human interaction in the actual manufacturing process. This process will utilize one station for all step of manufacturing through the use of a system of robotic arms, sewing apparatus, and mannequins. Further, the present invention seeks to manufacture various types of garments not including shoes. The focus of the current invention is to create various types of custom-fitting garments in a one-stop shop manner operated through the use of common computing devices.

Further, U.S. Patent No. 20170259445 to Safavi discloses an automated fabric picking process which uses a table-top, cutter, computing device, and flexible tubing to prepare and organize textile panels for storage. The labeling created by the computing system would make it easier to locate the packed fabric panels for orders. Also, U.S. Pat. No. 9,635,908 to Chih-Chi describes and automated cutting of pliable materials like those used on shoe manufacturing. The invention uses computer imaging to determine the appropriate cutting patterns. Then, a vacuum is contemplated to hold materials so that a computer-guided laser could be used to cut the materials to pattern. U.S. Pat. No. 9,617,672 to Lonati describes a method for automated closures of underwear through the use of actuators, tubes, and a sewing or linking head. The current invention seeks to utilize an automated system to complete all steps in the manufacturing process. The current invention moves pass just automating one aspect of the manufacturing process. The aim of this invention is to create finished garments ready for customer use manufactured with speed and accuracy.

U.S. Pat. No. 6,835,258 to Bingham discloses a method of garment manufacturing wherein a tubular or circular blank is loaded onto a carrier, which is then transferred via conveyor from one workstation to another. Each station adds another attribute to the garment. The current invention eliminates the need for multiple workstations in the manufacturing process. The current invention does not require conveyor belts or any other transfering of the garment during the actual manufacturing. This one-station aspect lowers costs and increases production in that each station would be attributed its own output numbers. Also, the current invention utilizes various sized mannequins to address a custom-fitting product.

Finally, U.S. Pat. No. 6,585,840 to Rabe discloses a method for either semi-automatic or fully-automated manufacturing of garments through a looping system. The insert is loaded into the looping fixture. While it is one looping system, each part of the garment is attached at a different workstation in the loop. It resembles a track-like machin. The current invention is much less cumbersome than the aforementioned looping process. In the current invention the process happens in one area, and all processes are completed by way of the robotic arms as the material is attached to a mannequin for custom fitting.

The current invention describes a more streamlined method for manufacturing various types of garments in one workstation. The invention contemplates cutting costs and and increasing accuracy for large scale garment manufacturers producers. It also contemplates eliminating bulky machinery and cumbersome processes for small scale garment manufacturers. The aspect of the various sizing mannequins opens up the manufacturing process to custom fitting garments without complicated body sizing methods. The method eliminates the use of various workstations manned by human labor or the need to purchase various machinery that only covers a portion of the manufacturing process. In these regards, the current invention differs from the design and intent of the the prior art, and is an improvement upon the existing prior art for automated manufacturing of garments.

SUMMARY OF THE INVENTION

In view of the foregoing disadvantages in the known types of attempted solutions for a method for automated manufacturing of garments now present in prior art, the present invention provides for the manufacturing of garments through a process for a single-workstation machine which utilizes robotic arms for the manufacturing based on computer-imputed data, customized based on the size and shape of attached mannequins.

It is an object of the present invention to provide a new and improved method for automatically manufacturing garments that has all the advantages of the prior art and none of the disadvantages.

It is another object of the present invention to provide a method of process that uses only one workstation, wherein its structure and design allows for all steps of the manufacturing process to completed at a single workstation from start to finish.

Another aspect of the present invention is to provide a custom fitting garments through the use of attached mannequins for sizing and shaping purposes.

Yet another aspect of the present invention is to provide manufacturing machinery that can be easily operated by the users utilizing familiar computing devices connected to the machine.

Another aspect of the present invention is to provide a method of manufacturing that eliminates the aspect of human error and reducing labor costs associated with the manufacturing of garments.

A final object of the present invention is to provide an automated method of garment manufacturing in two embodiments: first as a larger workstation for greater and faster output for larger-scale manufacturers, and second as a smaller workstation for a convenient, comfortable, and less cost-prohibitive option for smaller scale manufacturers or personal use.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and the manner in which it may be made and used may be better understood after a review of the following description, taken in connection with the accompanying drawings wherein numeral annotations are provided.

FIG. 1 shows a bird's eye view of the table workstation with a laptop computer attached via a USB/HDMI cable connection. Here, you can see the mannequin positioned in the center of the workstation with six robotic arms attached around the circular table. The robotic arms are in an open position. The trays are housed beneath the table. FIG. 1 displays the following: 1. Robotic Arm, 2. Robotic Arm, 3. Robotic Arm, 4. Robotic Arm, 5. Robotic Arm, 6. Robotic Arm, 7. Tray, 8. Tray, 9. Tray, 10. Tray, 11. Tray, 12. Tray, 13. Computer, 14. Cable Connection, 15. USB/HDMI, and 16. Mannequin.

Figure 2:
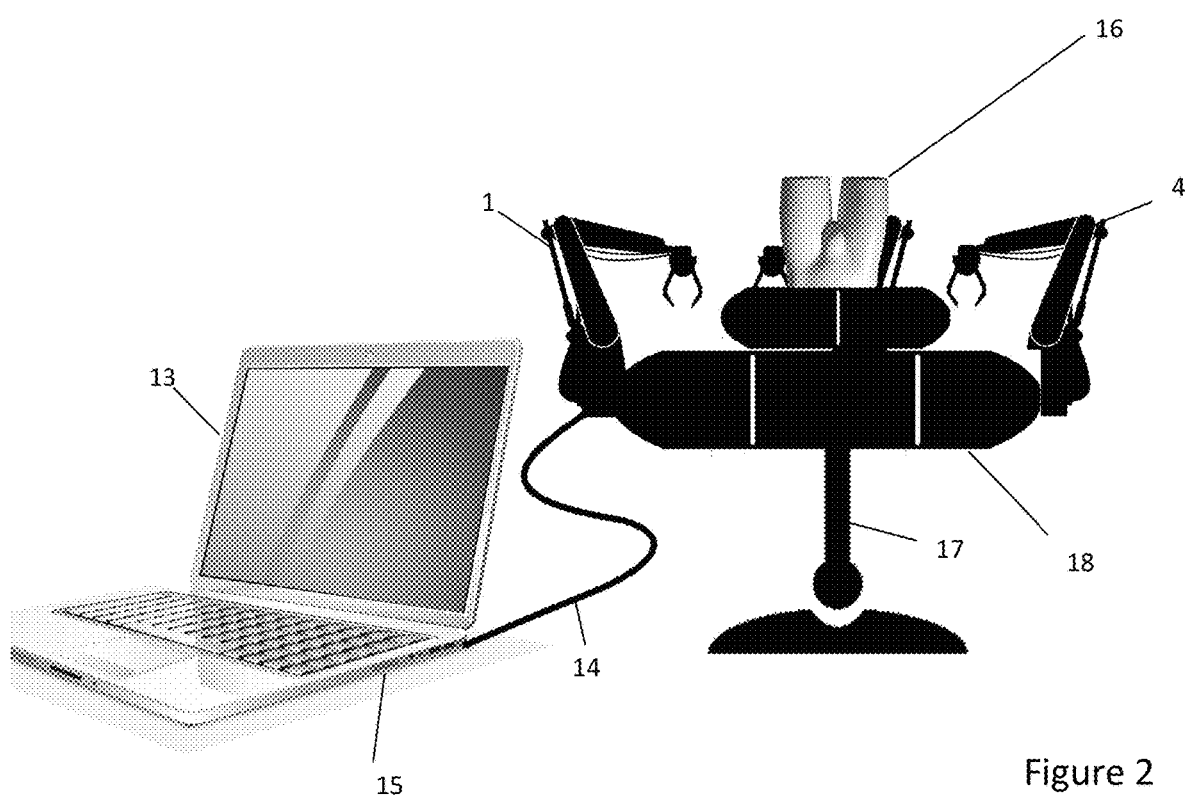

FIG. 2 shows side eye level view of the table workstation with a laptop computer connected via a USB/HDMI cable connection. The mannequin is connected on a platform attached to the workstation. The workstation is connected to the floor by a stand. Two of the robotic arms are in view. FIG. 2 displays the following: 1. Robotic Arm, 4. Robotic Arm, 13. Computer, 14. Cable Connection, 15. USB/HDMI, 16. Mannequin, 17. Workstation, and 18. Stand.

DETAILED DESCRIPTION OF THE INVENTION

Reference is made herein to the attached drawings. The figures are intended for representation purposes only and should not be considered to be limiting in any respect.

Referring now to FIG. 1 there is shown an overhead view of the machine used in the current method of manufacturing in an open configuration and ready for the initiation of the manufacturing process from the attached computer. The first step is for a pattern to be made and cut to size. Once the pattern is made, each tray will have a piece of the fabric placed on it. Depending on the construction of the product, depends on how many trays/fabrics will be needed, and the steps to produce the product. The next step is to enter specs/dimensions of the goods that need to be reproduced/manufactured. Once all information has been imputed, the correct size of a mannequin will be attached to the machine. A start button will begin the process of producing/manufacturing a product. The two robotic arms will pick up the two pieces of fabric attached it to the mannequin. The robotic arms will have pinching adaptors attached to the robot, therefore the fabric can be held in place in order for the next robotic arm to begin sewing. The sewing will begin with a different robot with a different adaptor attached to the robotic arm. Each robotic arm that's sewing will have a feed for the thread to do the sewing. This process will repeat it in a circular rotation until the product is completed.

Now referring to FIG. 2, there is shown a frontal perspective view of the machinery for the current process for automated manufacturing of garments. The spinning wheels on the robotic arms allow for the arms to maneuver in a manner to compete the various steps required in the manufacturing process. While the mannequin is secured on the mannequin platform, the robotic arms will secure the fabric to the mannequin. The process will continue until completed finished without human manipulation.

Two embodiments of the present invention are contemplated in regards to the size, speed, and construction. A first embodiment is useful for a large business desiring large scale production is a faster and more accurate manner than currently offered by prior art. While any computing device can be connected to the machine, the table and robotic arms are larger for increased production. The larger sized machinery allows for increased outputting speeds for mass production. These types of users will enjoy the benefit of less labor expenses and greater accuracy in production, which will result in greater yields and less waste of products. A second embodiment is more suited for smaller businesses or personal use. Again any computing device can be connecting to the machine. However, the table and robotic arms are much smaller. This will allow for the machine to fit into smaller areas while still providing quality fitting garments without the need for human involvement. This will also result in a less expensive machine. In both embodiments, the current invention will save both types of uses time and money in regards to producing custom fitting garments.

Overall, the present invention provides for a method of automating the manufacturing of garments from start to finish without the disadvantages of human error or necessity for multi-station production. The mannequins utilized ensure that the finished garments will have a custom fit. The input of data from connected computer and the use of various mannequin sizes and shapes provides for a high level of accuracy and flexibility in the process. The design of this process also offers an increase in the speed for an automated garment manufacturing method. The present invention also offers an ease of use so that it can be operated by the average computer user.

Inefficiencies in the manufacturing of garments are created by human errors which negatively impact the bottom-line. Human errors also create delays in production which increases the time for the product to get to market. Also, the industry does not support small scale production orders at a competitive prices.

The purpose of the automated process for manufacturing clothing is to improve the speed and efficiency for sewing garments together by 1) reducing human error by removing the human contact with the fabric during assembly of products and 2) eliminating the use of several stations of production in different locations in the factor. In the past, a typical factor would sew individual pieces at one station and pass them along to different stages in the assembly process until its completed. The automated process for manufacturing clothing includes inputting a pattern, cutting the fabric pieces according to pattern sizes, placing fabric pieces into corresponding trays, imputing the specific product dimensions, placing the fabric on the corresponding mannequin, and sewing the pieces of fabric together while attached to the mannequin.

In light of the given disclosure and the relevant prior art, it is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automated method for manufacturing garments, comprising:
    providing a table workstation with robotic arms having adjustable hands, an adjustable mannequin holding post, grooves in the table workstation, and trays storing fabric;
    providing a computing device to control the table workstation and robotic arms, wherein the computing device is capable of connecting to software to receive pattern data for creating garments;
    selecting a mannequin from a plurality of mannequins to allow for garments to be made having various types shapes, and sizes;
    removing fabric from one of the trays using one of the robotic arms;
    cutting the fabric along one of the grooves;
    securing the fabrics to the mannequin; and
    creating garments via the robotic arms.

2. The method of process in claim 1, wherein each robotic arm having a different hand function.

3. The method in claim 1, wherein the mannequins having various shapes and sizes and consist of materials to maintain attachment to fabrics while being manufactured.

4. The method in claim 1, wherein the computing device delivering the pattern instructions to the table workstation.

5. The method in claim 1, wherein the robotic arms securing the fabric piece in place and sewing the garment according to the computer-generated specifications along with the custom fitting of the materials on the mannequin.

6. The method in claim 1, wherein removing the garment from the mannequin via the robotic arms and placing the garment into a corresponding tray for storage.

7. An automated apparatus for manufacturing garments, comprising:
 a table workstation with robotic arms having adjustable hands, an adjustable mannequin holding post, grooves in the table workstation, and trays storing fabric;
 and a computing device to control the table workstation and robotic arms, wherein the computing device is capable of connecting to software to receive pattern data for creating garments;
 and a removable and adjustable mannequin.

\* \* \* \* \*